April 21, 1953      J. E. ANDERSON      2,635,702
PITCH LOCK MECHANISM

Filed Nov. 23, 1949      2 SHEETS—SHEET 1

Inventor
John E. Anderson
by Harris C. Luther
Attorney

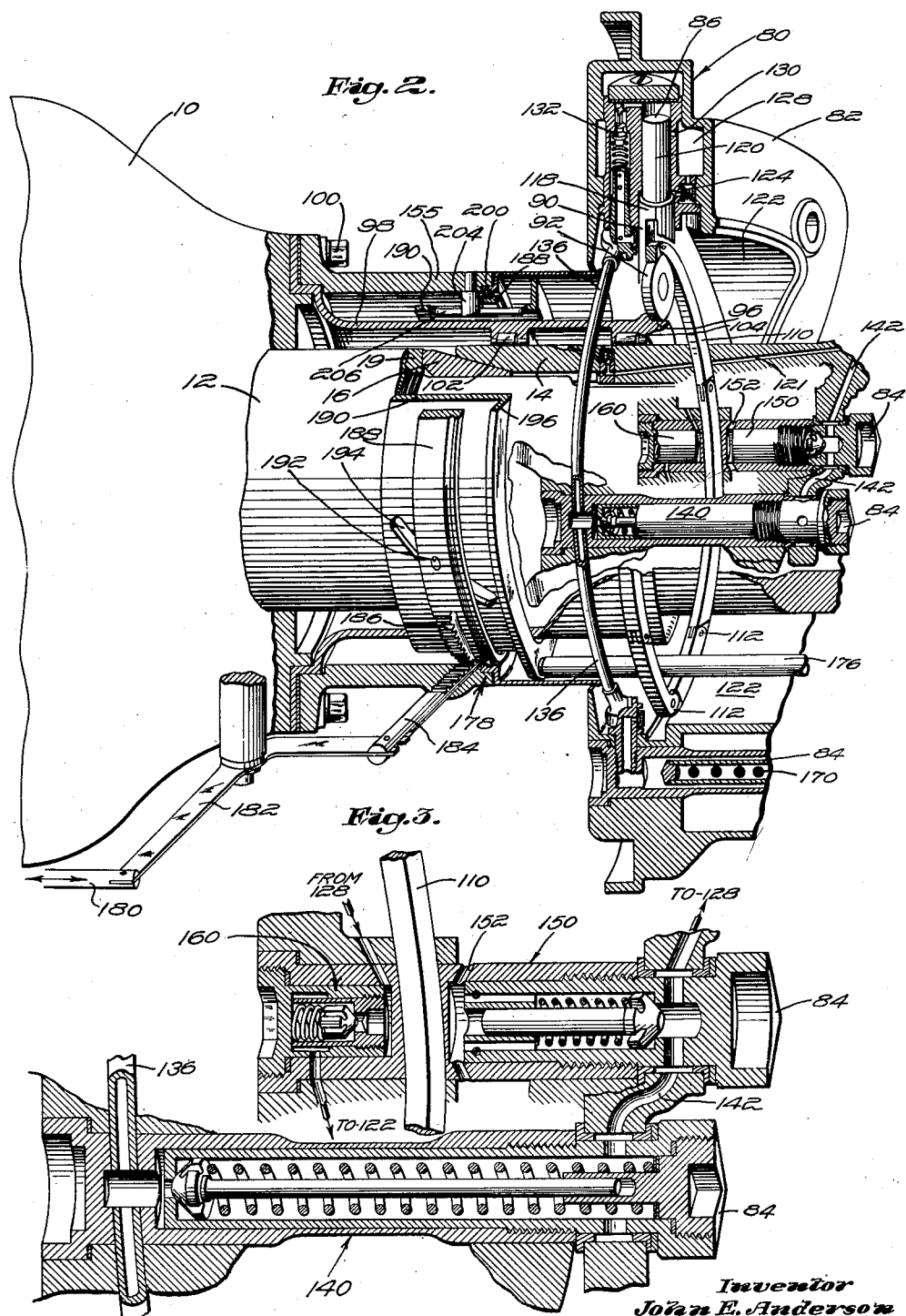

Patented Apr. 21, 1953

2,635,702

UNITED STATES PATENT OFFICE 2,635,702

PITCH LOCK MECHANISM

John E. Anderson, Portland, Conn., assignor to United Aircraft Corporation, East Hartford, Conn., a corporation of Delaware Application November 23, 1949, Serial No. 128,955

6 Claims. (Cl. 170—160.33)

This invention relates to controllable pitch propellers and more specifically to a propeller blade pitch lock mechanism for hydraulically controlled propellers. A pitch lock mechanism having some characteristics which are similar to this invention is described and claimed in co-pending patent application Serial No. 129,082, filed November 23, 1949, by Martin et al.

It is an object of this invention to provide a hydraulically operated controllable pitch propeller having a blade pitch lock mechanism which responds to a loss in operating oil pressure to lock the blades against pitch change.

It is another object of this invention to provide a propeller blade pitch lock which utilizes the operating oil pressure in the propeller system to normally maintain the lock out of engagement.

It is a further object of this invention to provide a blade pitch lock for an hydraulically operated propeller which automatically permits movement of the blades toward high pitch when the lock is engaged so that, subsequent to a pressure loss, when sufficient auxiliary or normal pressure is built up the lock mechanism permits movement of the blades toward high pitch even prior to the time that the pitch lock becomes disengaged while still preventing movement of the blades toward low pitch in the event that the pressure build up is sporadic or fluctuating.

These and other objects of this invention will become readily apparent from the following detailed description of the accompanying drawings in which, Fig. 1 is a perspective view in partial section illustrating the forward portion of the propeller hub including the blade mounting, the related blade pitch actuating mechanism, and the pitch lock of this invention.

Fig. 2 is a perspective view in partial section illustrating the rear portion of the Fig. 1 structure including the related mechanism housed therein.

Fig. 3 is a detail cross sectional view of the relief valve mechanism shown in Fig. 2.

Figure 1:
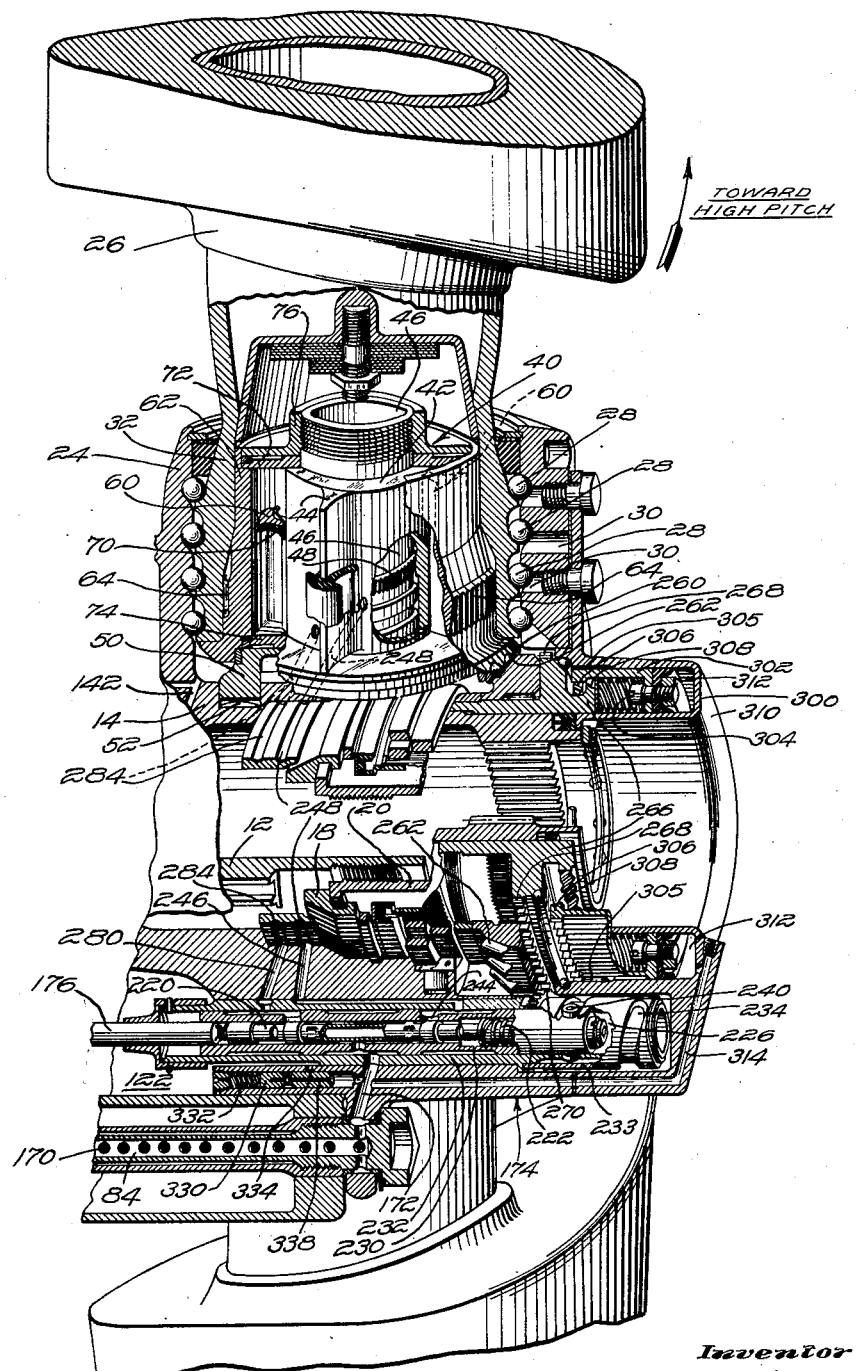

Referring to Figs. 1 and 2, the nose section 10 of an engine is shown having a driving shaft 12 protruding therefrom onto which is attached a propeller hub 14. The hub 14 is positioned on the shaft by means of a rear cone 16 (Fig. 2) and a front cone 18 (Fig. 1). The rear cone 16 abuts a fixed flange 19 on the drive shaft 12 so that the hub 14 is held fixed between the cones and on the driving shaft by the retaining nut 20 which bears against the front cone 18. The hub 14 includes a plurality of radially extending sockets 24 (Fig. 1) into each of which is mounted a propeller blade 26. Each of blades 26 is held in position in the sockets 24 by a series of rows of ball bearings 28 which are inserted in their respective races through holes 30 which are provided in the socket 24. While the ball bearings 28 are being inserted the blade shank 32 is in the bottom of the socket 24 and when the respective ball bearing races are completely filled the blade is forced radially outwardly from the hub by means of a jackscrew mechanism (not shown for convenience) in order to preload the ball bearings 28 and rigidly fix the propeller blade in position.

A vane motor generally shown at 40 is contained centrally of each blade shank 32 for hydraulically varying the pitch of the blade. The vane motor 40 includes a sleeve 42 which has two diametrically opposite integral vanes 44 and is fixed to a hub center post 46 by means of a spline 48. The center post 46 is maintained in fixed relationship with the hub 14 by means of drive lugs 50 which mate with slots 52 in the hub 14. The movable portion of the vane motor 40 includes two diametrically opposed vanes 60 formed integral with an outer sleeve 62 which is fixed to the internal peripheral surface of the blade shank by means of splines 64. Both the hub carried vanes 44 and the blade carried vanes 60 include suitable seals 70 in order to prevent fluid leakage past these vanes. Diaphragm type sealing plates 72 and 74 are provided at the upper and lower ends respectively of the vane motor 40 and are firmly held in sealing engagement with their adjacent surfaces by means of a lock nut 76 which is threaded on to the outer extremity of the hub center post 46.

The supply of hydraulic fluid under pressure for operating the vane motors 40 is obtained from a pump generally indicated at 80 (Fig. 2) which is housed within an annular casing 82 which in turn is mounted to the rear portion of the hub 14 by means of a plurality of hollow through bolts as for example shown at 84. The pump 80 includes a plurality of pistons 86 which are peripherally spaced about the hub axis each of which pistons includes a bifurcated portion 90 for carrying a roller 92 thereon. Reciprocating movement is imparted to the piston 86 by means of an eccentric cam surface 96 carried by a sleeve 98 coaxially disposed about the drive shaft 12 and having its one end fixed to the engine nose by means of a bolt and nut 100 and having its other end supported on the hub 14 by means of spaced roller bearings 102 and 104. Thus during propeller rotation the entire pump casing 82 and the pump 80 therein will revolve about the fixed sleeve 98 so that reciprocal motion is imparted to each of the pump pistons 86. A ring 110 keeps the rollers 92 in contact with the cam surface 96 in opposition to the suction pull of the pistons and centrifugal force. For assembly purposes the ring 110 may be made in sections and joined as at 112.

Each of the pistons 86 has two different diameters, a comparatively large diameter 118 for low pressure and a comparatively small diameter 120 for high pressure. The large diameter piston 118 takes in oil which, through leakage and drainage from the hub, for example via line 121, accumulates in the open trough 122 and forces it through the check valve 124 and into a low pressure chamber 128 from whence it can pass through the port 130 and subsequently be further compressed by the high pressure piston 120. Centrifugal force will maintain the oil near the periphery of the trough during propeller rotation. The high pressure oil is forced through a check valve 132 and then into a high pressure manifold 136 wherein the fluid pressure is maintained at some predetermined value, for instance three thousand pounds per square inch, by means of a relief valve 140 contained within one of the hollow through bolts 84. The pump mechanism just described and the principle of operation thereof is more fully described and claimed in Patent No. 2,462,931, issued March 1, 1949, to J. E. Anderson.

The oil which is by-passed by the valve 140 during its relieving operation passes via the duct 142 to lubricate the hub mechanism. The lubricating oil is maintained at proper pressure by means of a safety valve 150 which is housed within another of the through bolts 84 and passes excess oil back into the low pressure chamber 128 by means of a passage 152. An air relief valve 160 also disposed in one of the through bolts 84 connects the low pressure chamber 128 with the open trough 122.

The high pressure fluid from the manifold 136 is conducted to the propeller operating and control mechanism through a strainer 170 the aft end of which is shown in Fig. 2 and the front end of which is shown in Fig. 1, the strainer being housed in another of the through bolts 84. The high pressure fluid leaving the strainer 170 is directed via a passage 172 to a distributor valve 174 which directs this fluid to either side of the vane motor 40 to vary the pitch of the propeller blade. The distributor valve 174 is controlled by means of a rod 176 through a translating mechanism generally indicated at 178 (Fig. 2). This mechanism is operated manually from the cockpit by means of a control rod 180 and a bell crank 182 pivoted on fixed structure and which reciprocably moves a rack 184 in a direction transverse to the axis of the engine drive shaft. The rack 184 meshes with a gear segment 186 integral with a ring 188 which in turn is rotatable but fixed axially so that rotational movement thereof will impart axial movement to an inner coaxial flanged ring 190 by means of the camming action of the pin 192 in the curved slot 194 carried by the ring 190. The ring 188 is supported by a ball bearing assembly 200 which is carried by the fixed oil guard 155 protruding from the engine nose section. A pin 204 depends from the oil guard 155 and engages a fore and aft slot 206 in the flanged ring 190 so that the ring 190 will be restrained from rotation during the camming action of the pin 192 in the slot 194. Thus the ring 190 is permitted to move substantially in an axial direction only. Part of the ring 190 has the flanged front face 196 thereof engaging the end of the rod 176 thereby providing reciprocable controlling movements for the valve 174. It is to be understood that the translating mechanism 178 may be operated if desired by means of any of the well-known types of governor controlling mechanism.

Movement of the rod 176 positions the valve stem 220 within the distributor valve 174 to direct hydraulic fluid under pressure to either side of the vane motor 40 to vary the pitch of the propeller blade. Valve stem 220 is integral with the rod 176 and the rod 176 is held firmly against the flange 196 by means of a compression spring 222 which is also aided by lubricating oil pressure within the chamber 226 adjacent the forward end of the distributor valve. The pressure in the chamber 226 is substantially the same as that which exists in the previously mentioned low pressure chamber 128.

The valve 174 includes the inner casing 230 which houses the valve stem 220 and an outer or bushing casing 232 which at its forward or outboard end carries a follow-up sleeve 233 containing a spiral slot 234. Pin 240 fixed on the inner casing 230 is guided by the spiral slot in the follow-up sleeve 233 and an axial straight slot in the outer casing 232 so that upon rotation of the sleeve 233 the inner casing will be moved fore and aft so as to constitute a follow-up mechanism during propeller blade pitch change. The Fig. 1 position of the valve stem 220 is such that oil under pressure is directed from the passage 172 through the port 244 into a passage 246 and then to the annular passage 248 leading to the side of the vane motor 40 which will urge the blade 26 toward high pitch position as indicated by the arrow. During pitch change the segment gear 260 on the propeller blade rotates the blade interconnecting gear 262 which in turn rotates the blade connecting gear hub 266 whose integral external gear teeth 268 rotate a gear 270 carried by the sleeve 233 of the distributor valve 174. Thus it is apparent that as the valve stem 220 is moved to the position shown for increasing the pitch of the propeller blade, subsequent movement of the propeller blade will reposition the inner casing 230 of the valve 174 so that the valve is re-established in a neutral position. The valve mechanism just described is of the type disclosed in Patent No. 2,426,932, issued March 1, 1949, to J. E. Anderson. It will be apparent that to move the propeller blade to low pitch the valve stem 220 will be positioned to conduct high pressure fluid to the passage 280 and thence to the passage 284 leading to the low pitch side of the vane motor 40. Simultaneously, then, movement of the blade to a low pitch will also cause the follow-up mechanism on the distributor valve 174 to reposition the valve elements to a proper neutral position.

In the event that the pressure in the manifold 136 and correspondingly in the passage 172 which leads from the strainer 170 (Fig. 1), fails or drops below a predetermined value, an automatic pitch lock mechanism is provided to prevent the blade 26 from moving to low pitch by centrifugal twisting moment or other aerodynamic forces. To this end a pitch lock generally indicated at 300 is carried by the forward end of the propeller hub and comprises an annular piston 302 which is biased toward the outboard end or nose of the propeller hub by means of a plurality of springs 304. The annular piston 302 is stationary relative to the hub but axially slidable as a result of a splined connection 305 with the hub and carries at its aft end an internal spiral spline 306 which is engageable with an external mating spline 308 carried by the forward end of the blade connecting gear hub 266. An annular cylinder type casing 310 surrounds piston 302 thereby forming a chamber 312 which communicates with passage 314 leading to the high pressure passage 172 adjacent the screen 170. During normal operation the high pressure in the chamber 312 maintains the annular piston 302 in an aft position against the pressure of the springs 304 so that the spiral splines 306 and 308 remain disengaged. It should be noted that the high pressure in the chamber 312 must react both against the springs 304 and also against the pressure of the lubricating oil which is being supplied from the low pressure chamber 128 which in turn is fed by the low pressure stage of the previously mentioned pump mechanism. The splines 306 and 308 are spiralled in such a direction that as they are moved into engagement, rotation of the propeller blades toward low pitch will cause further engagement of the splines to positively lock them together. However, due to the incline of the splined teeth for this purpose any attempt at rotation of the propeller blades toward high pitch will tend to force the spline 306 aft and away from engagement with the splines 308. The splines, then, constitute a ratchet mechanism.

Thus in the event that the high pressure fluid being supplied to the propeller blades for pitch variation falls below a predetermined value the subsequent reduction of pressure in the annular chamber 312 will permit the springs 304 and the fluid pressure on the aft side of the piston 302 to move the latter forward so that the spiral splines 306 will engage the splines 308 on the blade connecting gear hub 266 to prevent rotation of the latter. In this position of the piston and the spline mechanism the propeller blades will be prevented from pitch change toward a low pitch position. However, in the event that oil pressure is restored and for example the distributor valve 174 is positioned for movement of the blades toward high pitch, the pressure in the chamber 312 will move the piston 302 toward unlock position which movement of the piston will be further aided as the propeller blade is being forced toward high pitch since the splines 306 and 308 are urged out of engagement during the movement toward high pitch.

In order to accelerate the engagement of the locking mechanism a valve 330 is provided which is normally held in a closed position against the pressure of a spring 332 by the high fluid pressure in the passage 172. Thus when a predetermined drop in fluid pressure occurs the spring 332 will move the valve 330 toward the right thereby venting the high pressure passage 172 via a port 334 to the open trough 122. In this manner the pressure in the passage 172 and consequently in the pitch locking mechanism chamber 312 is instantaneously reduced to aid the springs 304 to quickly engage the locking splines. The bleed passage 338 in the valve 330 is of such a small dimension that when pressure is again being restored the total capacity of the pumps or other source of pressure is greater than the bleeding capacity of the passage 338. Hence during pressure build up the valve 330 will again be moved toward an aft position as shown to block the port 334 and permit further increase in pressure.

It will be evident that the necessary oil for permitting the pumps to restore adequate operating pressure may be supplied from an auxiliary tank which can be operatively connected to the inside of the oil guard. The oil in turn will normally flow by centrifugal force back into the trough 122 from whence it can be pumped into the high pressure manifold 136.

As a result of this invention it is evident that a simple, rugged, automatic pitch lock mechanism has been provided for maintaining the pitch of controllable propeller blades at a safe high angle until proper operating pressure can be restored.

Further the pitch lock mechanism will permit continued operation of the propeller in the event that oil pressure cannot be restored while preventing over-speeding of the power plant which drives the propeller.

It is also evident as a result of this invention a pitch lock mechanism has been provided which will automatically permit movement of the blades toward higher pitch but will prevent any decrease pitch movements of the blades during low hydraulic pressure operating conditions.

It will be apparent that although a preferred embodiment of this invention has been illustrated and described, changes and modifications in the construction and arrangement of the parts may be made without departing from the scope of this novel concept.

What it is desired by Letters Patent is:

1. In combination in a propeller, means for changing propeller pitch comprising, an hydraulic motor, a source of fluid under pressure, and means including a valve connecting said source and said motor, means for locking the propeller blades against pitch changes comprising a lock, an hydraulic piston connected with said source of pressure for urging said lock into unlocking position and a spring for urging said lock into locking position, said lock comprising spiral splines connected with said blades and mating spiral splines connected with the propeller hub, said spiral splines arranged in a direction such that movement of the blades toward low pitch will force the partially engaged splines into full engagement and movement of the blades toward high pitch will assist in disengaging said spiral splines and unlocking the blades.

2. In a propeller having a hub, a plurality of blades mounted for pitch changing movement in said hub, a blade lock comprising a rotatable member connected with said blades and having a set of spiral splines, a member fixed against rotation relative to said hub and having a set of spiral splines cooperating with said first mentioned splines, means for hydraulically moving said blades to vary the pitch thereof, a source of fluid under pressure for actuating said blade moving means, hydraulically actuated means connected with said source for holding said two sets of splines out of engagement, and means for moving said splines into engagement upon failure of said pressure.

3. In a propeller including a hub having variable pitch blades mounted therein, means for changing the pitch of said blades comprising, an hydraulic motor, high and low pressure sources of fluid and means including a valve connecting said high pressure source and said motor, means for locking the propeller blades against pitch changes comprising a lock, an hydraulic piston connected with said sources whereby said high pressure urges said lock into unlock position, and means for urging said lock into locking position including a spring and fluid from said low pressure source, said lock comprising spiral splines connected with said blades and cooperating spiral splines connected with said hub, said spiral splines arranged in a direction such that movement of the blades toward low pitch will fully engage the splines when partially engaged to lock the blades and blade movement toward high pitch will disengage said splines and unlock the blades.

4. In a propeller including a hub having variable pitch blades mounted therein, means for changing the pitch of said blades comprising an hydraulic motor, high and low pressure sources of fluid, and means including a valve connecting said high pressure source and said motor, means for locking the propeller blades against pitch changes comprising a lock, an hydraulic piston connected with said sources whereby said high pressure urges said lock into unlock position, and means for urging said lock into locking position including a spring and fluid from said low pressure source, said lock comprising spiral splines connected with said blades and cooperating spiral splines connected with said hub, said spiral splines arranged in a direction such that movement of the blades toward low pitch will fully engage the splines when partially engaged to lock the blades and blade movement toward high pitch will disengage said splines and unlock the blades, and means for accelerating the disengagement of said splines including a valve responsive to a predetermined reduction in said high pressure fluid for venting to atmosphere the high pressure fluid acting on said lock.

5. In a blade lock for a propeller having a hub, a plurality of blades mounted for pitch changing movement in said hub, mechanism for changing the blade pitch and a source of fluid under pressure for operating said mechanism, the combination of lock means including cooperating ratchet elements engageable in one direction, one of said elements being rotatable with respect to said hub during pitch changing movements of said blades and another of said elements fixed against rotation relative to said hub, means including fluid connections from said source to said lock means for maintaining said elements in disengaged position, means responsive to a predetermined reduction in the pressure of said fluid acting on said lock means for engaging said elements, a second source of fluid under pressure which is lower than said first mentioned source, and means for accelerating the engagement of said elements including mechanism for venting said lock means to said second source, said last mentioned mechanism including fluid connections to both said sources and said lock means.

6. In an hydraulically operated propeller having a hub and variable pitch blades, means for varying the pitch of the blades comprising an hydraulic motor operatively connected to the blades, a source of fluid under pressure, and means including a valve connecting said source and said motor, means for locking the blades against pitch changes comprising a lock, an hydraulic piston responsive to said fluid pressure for urging said lock into unlock position and a spring for urging said lock into locked position, said lock comprising cooperating ratchet elements engageable in one direction, one of said elements being connected with said blades and movable therewith during pitch change and another of said elements being engageable with said first element and connected for rotation with said hub, and means responsive to a predetermined reduction in pressure from said source for accelerating the lock engagement by said spring including a vent and a valve for directing said fluid under pressure acting on said hydraulic piston to said vent, said valve being operatively connected to said piston and said source of fluid under pressure.

JOHN E. ANDERSON.

References Cited in the file of this patent

UNITED STATES PATENTS

| Number | Name | Date |
| --- | --- | --- |
| 1,962,459 | Ostlund | June 12, 1934 |
| 2,276,347 | Ruths et al. | Mar. 17, 1942 |
| 2,320,195 | Rindfleisch | May 25, 1943 |
| 2,370,135 | Berliner | Feb. 27, 1945 |

FOREIGN PATENTS

| Number | Country | Date |
| --- | --- | --- |
| 496,022 | Great Britain | Nov. 23, 1938 |
| 497,999 | Great Britain | Jan. 2, 1939 |